United States Patent [19]
Yamasaki et al.

[11] Patent Number: 5,835,476
[45] Date of Patent: Nov. 10, 1998

[54] LASER DIODE DRIVING APPARATUS

[75] Inventors: Yoshimari Yamasaki, Tokyo; Yasunori Terayama, Chiba; Toshiaki Iimura, Kanagawa, all of Japan

[73] Assignee: Sony Corporation, Tokyo, Japan

[21] Appl. No.: 488,140

[22] PCT Filed: Jul. 12, 1989

[86] PCT No.: PCT/JP89/00703

§ 371 Date: Mar. 5, 1990

§ 102(e) Date: Mar. 5, 1990

[87] PCT Pub. No.: WO90/01206

PCT Pub. Date: Aug. 2, 1990

[30] Foreign Application Priority Data

Jul. 18, 1988 [JP] Japan ............................. 63-177084

[51] Int. Cl.⁶ ............................................. G11B 7/00
[52] U.S. Cl. ................................. 369/116; 369/54
[58] Field of Search ............................. 369/116, 100, 369/44.32, 32, 48, 106, 107, 112, 119, 54, 58

[56] References Cited

U.S. PATENT DOCUMENTS

| | | | |
|---|---|---|---|
| 4,692,606 | 9/1987 | Sakai et al. | 369/116 |
| 4,698,797 | 10/1987 | Komatsu | 369/116 |
| 4,701,609 | 10/1987 | Koishi et al. | 369/116 |
| 4,811,329 | 3/1989 | Shikama et al. | 369/116 |
| 4,817,097 | 3/1989 | DuFour | 369/116 |
| 4,843,604 | 6/1989 | Fujiwara et al. | 369/116 |
| 4,935,914 | 6/1990 | Morita et al. | 369/116 |
| 4,937,809 | 6/1990 | Miyadera et al. | 369/116 |

FOREIGN PATENT DOCUMENTS

| | | |
|---|---|---|
| 0 256 827 | 2/1988 | European Pat. Off. . |
| 262 713 | 4/1988 | European Pat. Off. . |
| 2472 243 | 6/1981 | France . |
| 61-296539(A) | 12/1986 | Japan . |
| 62-89248(A) | 4/1987 | Japan . |
| 63-46633(A) | 2/1988 | Japan . |

*Primary Examiner*—Muhammad N. Edun
*Attorney, Agent, or Firm*—Frommer Lawrence & Haug LLP; William S. Frommer

[57] ABSTRACT

A laser diode driving apparatus detects the laser power output of a semiconductor laser diode (13), irradiating a laser bean on a write-once or overwrite optical disk (11), by a detector (14), compares the resulting detection output signal by a comparator (17) with a laser power setting signal, modulates the resulting comparison output signal with record data by a modulating device (19), and drives the laser diode (13) by a driving device (22) with the resulting modulation output signal. By providing the modulation device (19) in the APC circuit adapted for controlling the output of the semiconductor laser diode (13), it becomes possible to automatically set the laser power necessary for recording to an optimum value, as well as to widen the temperature range and the working characteristics of the semiconductor laser diode.

3 Claims, 3 Drawing Sheets

LASER DIODE DRIVING APPARATUS

TECHNICAL FIELD

This invention relates to a laser diode driving apparatus for driving a laser diode that irradiates an optical disk with a laser beam. More particularly, it relates to a laser diode driving apparatus used for irradiating a write-once or over-write optical disk with a laser beam.

BACKGROUND ART

In the case of an optical disk, which is dedicated to reproduction and on which audio data or video signal are recorded in advance, the laser power irradiated on the disk for reading out recorded data on the disk is rather low and reproduction characteristics are not deteriorated to any marked extent as long as the laser power output is within the range of a certain reference level.

However, in the case of a recordable optical disk, such as the write-once or overwrite optical disk, which is being put to application at a rapid rate, the laser power consumed during recording is increased by a factor of seven to ten as compared with the power consumed during reproduction, while the optimum value of the laser power irradiated during recording on the optical disk is restricted to a narrow range.

Thus, when the laser power is increased excessively, the size and the shape of the recording pattern formed on the recording surface of the disk differs markedly from the predetermined size and shape, thus increasing the error rate or giving rise to crosstalk.

Also, when the laser power is lowered, the temperature on the recording surface falls short of the predetermined recording temperature to detract from the quality of the recorded data.

FIG. 1 shows diagrammatically a conventional APC (Auto Power Control) circuit for controlling the laser power, wherein 1 denotes a write-once type optical disk, and a portion encircled by a chain-dotted line 2 denotes an optical head for irradiating the optical disk 1 with a laser beam.

The optical head 2 is provided with a semiconductor laser diode 3. The light emitting from the semiconductor laser diode 3 is directed by way of a beam splitter BS and an objective lens L to the recording surface of the optical disk 1. The beam reflected from the semiconductor laser diode 3 is detected by a monitoring detector 4.

The numeral 5 denotes an amplifier for amplifying an electrical signal of the laser power detected by the detector 4, the numeral 6 comparator means to which a reference signal $E_1$ for the recording mode, a reference signal $E_2$ for the reproduction mode and a reference signal $E_3$ for the erasure mode are selectively applied, the numeral 7 a low-pass filter, the numeral 8 a summation circuit for summing a record data signal $E_D$ to the output of the comparator means 6, the numeral 9 a driver circuit for driving the semiconductor laser diode 3 and the numeral 10 a mode switch for selecting the reference signals $E_1$, $E_2$ and $E_3$ for the respective modes.

The summation circuit 8 is fed with the recording data signal $E_D$ at a constant amplitude during recording, and operates to sum the d.c. current supplied to the semiconductor laser diode 3 (the output of the low-pass filter 7) and the recording data signal $E_D$-together and to supply the summation output to the driver circuit 9.

The optical disk 1 has its recording surface formed of a material on which recording may be made magneto-optically.

As the optical disk 1 is rotated, the laser beam emitting from the semiconductor laser diode 3 is on-off controlled on the basis of the recording data signal $E_D$. The temperature of the portion of the optical disk 1 irradiated by the laser beam is raised suddenly to higher than the Curie temperature so that the direction of magnetization of the recording surface of the disk is changed and the recording data signal $E_D$ is recorded as the record pattern by a change in the magnetization direction.

The laser power of the laser beam emitted from the semiconductor laser diode 3 is detected by the detector 4, and the detection signal is compared at the comparator means 6 with the reference signal $E_1$ of the record mode. When the laser power is lowered, the output of the comparator 6 is increased, and the laser power is controlled by the APC circuit so that the output current of the driver circuit 9, which is the driving current increases. As a result, the optimum laser power for recording is set by the reference signal $E_1$ of the recording mode and the laser power for the record mode may be made constant despite changes in temperature or changes with lapse of time.

During the reproducing mode, the reference signal $E_2$ for the reproducing mode is selected and control by the APC curcuit is performed so that a laser beam of a lower power used for reading is emitted by the semiconductor laser diode 3. During the erasure mode, the reference signal $E_3$ for the erasure mode is selected and control by APC is performed so that a laser beam of a higher power used for erasure is emitted by the semiconductor laser diode 3.

With the above described APC circuit, when the light emitting output characteristics of the semiconductor laser diode 3 are as shown at A in FIG. 2, it suffices to set the reference voltage signal $E_1$ of the above record mode so that a drive current $i_L$ will be obtained which will give an optimum laser power $P_0$ for recording, and to supply an optimum bias current $I_{DC(A)}$ obtained from the comparator means 6 to the driver circuit 9 along with the record data to supply a modulated current shown at $i_A$ in FIG. 5 as the drive current for the semiconductor laser diode 3.

With such APC circuit, when the light emitting output characteristics of the semiconductor laser diode 3 are as shown at B in FIG. 2, a large bias current $I_{DC(B)}$ is output from the comparator means 6 so that the driving current supplied to the driving circuit 9 is as shown at $i_B$ in FIG. 2 and control is made to obtain the peak current value $i_{L1}$ so that the laser power has the optimum value $P_0$.

However, in this case, the minimum current value of the driving current $i_B$ is equal to $i_{L2}$, which is higher than the threshold current $I_{th}$ for which the light emitting output of the semiconductor diode 3 is approximately equal to zero.

In this case, while the peak value of the laser power output by the semiconductor laser diode 3 is controlled to be $P_0$ as described above, the laser beam having the laser power $P_1$ corresponding to the mimimum current value $i_{L2}$ of the driving current $i_B$ is irradiated on the recording surface even during the period when data is not recorded, so that the temperature of the area in which data are not recorded inherently is raised by the laser beam. This considerably deteriorates the recording data quality.

In this case, the current larger than the bias current $I_{DC(B)}$ always flows in the semiconductor laser diode 3 and shortens the service life of the semiconductor laser diode 3.

It may be contemplated to enlarge the maximum peak-to-peak value $I_{DP}$ of the driving current corresponding to the recording data signal $E_D$ so that $I_{DP} > i_{L1} - I_{th}$. However, in this case, even when the bias current $I_{DC}$ is zero for the characteristics A of the semiconductor laser diode 3, the peak value exceeds the optimum laser power $P_0$ so that operation as an APC circuit cannot be realized.

Consequently, only the conventional APC circuit for which the light emission output characteristics of the semiconductor laser diode are within a certain range can be utilized. This imposes restrictions in the manufacture of optical heads.

On the other hand, with the recording and/or reproducing apparatus on or from the optical disk, when the light emission output characteristics of the semiconductor laser diode are changed with temperature changes or with lapse of time, the recording characteristics become deteriorated, or the crosstalk is increased. Thus, in the worst case, the problem arises that data in the vicinity of the recording position are erased during the record mode.

OBJECTS OF THE INVENTION

In view of the foregoing, it is an object of the present invention to provide a laser diode driving apparatus for driving a semiconductor laser diode for irradiating a laser beam on a write-once or overwrite optical disk, in which the light emission characteristics and the temperature characteristics of the semiconductor laser diode employed are within an extensive range and in which the laser power required for data recording and erasure may be set automatically to an optimum value.

It is another object of the present invention to improve the durability of the semiconductor laser diode employed.

It is a further object of the present invention to provide a laser diode driving apparatus in which data may be recorded at a high quality.

SUMMARY OF THE INVENTION

For accomplishing the above objects, the driving apparatus for driving a laser diode comprises a monitoring detector for detecting laser light outputted for the laser diode and providing a corresponding detector output, comparator means for comparing said detector output from the monitoring detector and a laser power setting signal and providing a compared output, modulating means for providing a modulation signal by selectively turning on and off said compared output of comparator means in response to a recording signal, bias means for providing a constant bias current, summation means for summing said constant bias current with said modulation signal and providing a summation output signal, and driving means for driving said laser diode by said summation output signal.

According to the present invention, by providing the above modulating means in the APC circuit controlling the output power of the semiconductor laser diode, it becomes possible to automatically set the laser power necessitated for recording to an optimum value, even with different light emission characteristics of the semiconductor laser diode, and to widen the working characteristics and the temperature range of the semiconductor laser diode.

DESCRIPTION OF A PREFERRED EMBODIMENT OF THE INVENTION

Figure 1:
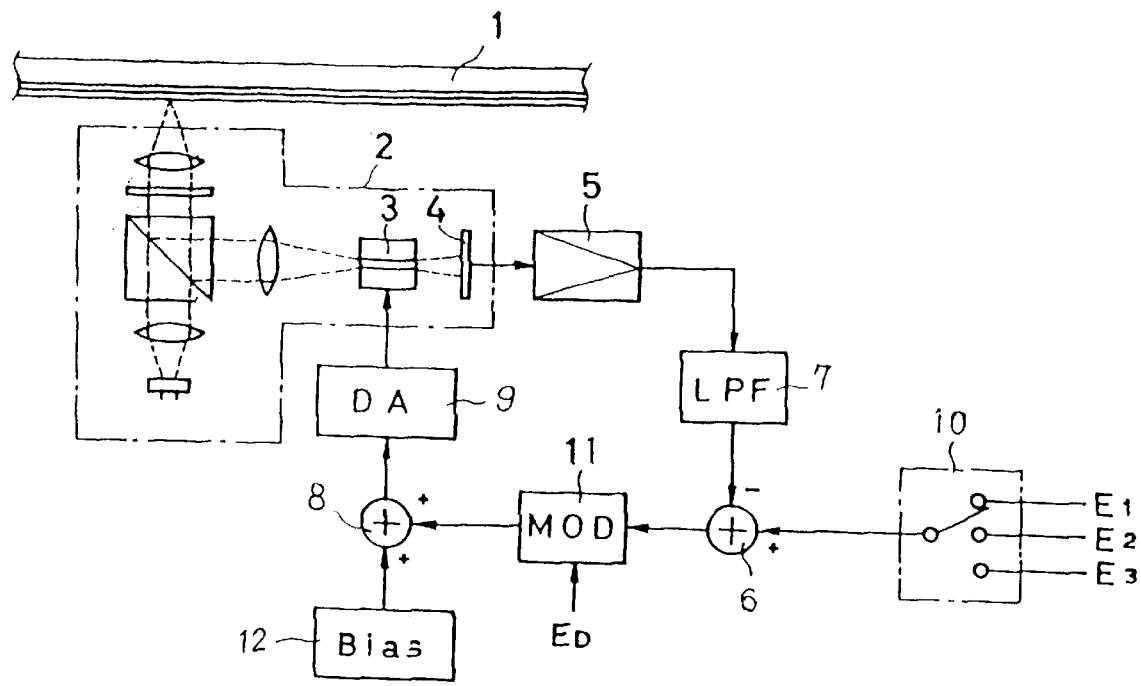
FIG. 1 is a block diagram for illustrating the construction of a conventional APC circuit.
Figure 2:
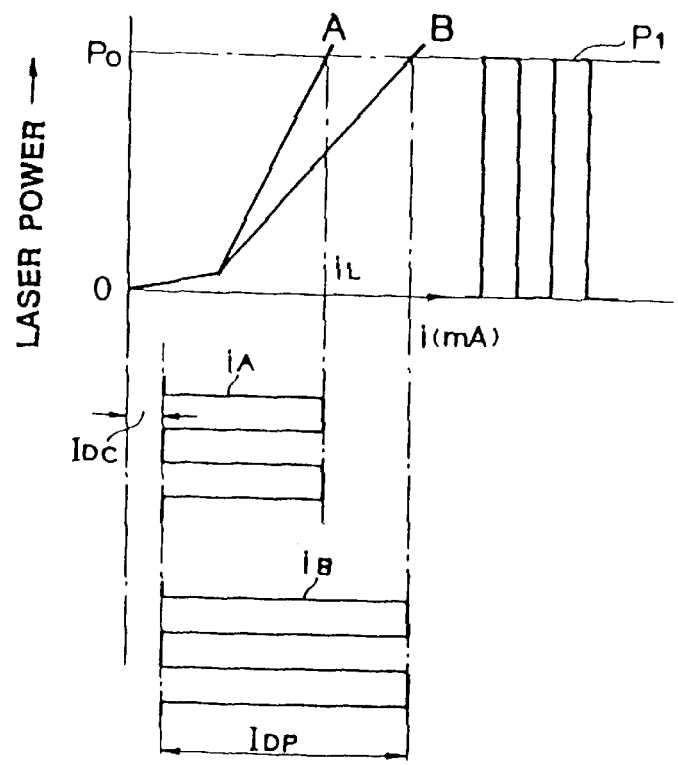
FIG. 2 is a waveform diagram for illustrating the operation of the above APC circuit.

An embodiment of the present invention will be explained in detail by referring to the drawings.

Figure 3:
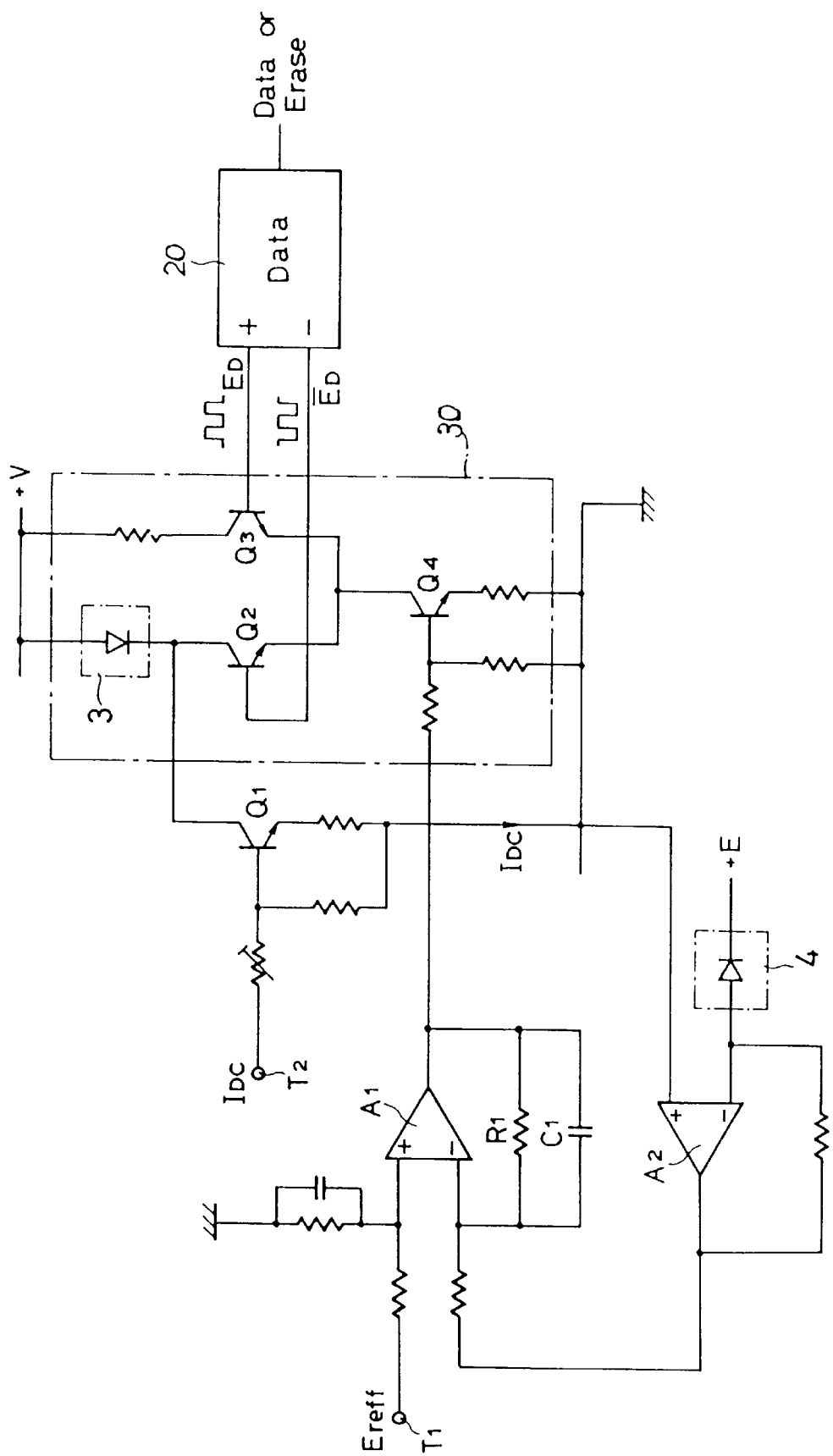
FIG. 3 is a block diagram showing the construction of a laser diode driving apparatus according to the present invention.

The block diagram of FIG. 3 shows the construction of a laser diode driving apparatus according to the present invention. This laser diode driving apparatus drives a semiconductor laser diode 13 radiating a laser beam for data recording and/or reproducing by an optical head 12 which performs data recording and/or reproducing on a overwrite optical disk 11 the recording surface of which is formed of a magneto-optically recordable material.

The optical head 12 is arranged so that the light radiated by the semiconductor diode 13 is radiated by way of a beam splitter BS and an objective lens L on the recording surface of the optical disk 11, and that the beam reflected from the semiconductor laser diode 13 is detected by a monitoring detector 14.

The monitoring detector 14 for the optical head 12 detects the laser power of the laser beam radiated by the semiconductor laser diode 13 on the recording surface of the optical disk 11 by a reflected beam and transmits the detection output signal from an amplifier 15 by way of a low-pass filter 16 to comparator means 17.

The comparator means 17 is supplied with a reference signal $E_1$ for the record mode, a reference signal $E_2$ for the reproducing mode and a reference signal $E_3$ for the erasure mode, as laser power setting means, by way of a mode switch 18, which is actuated in dependence upon the operating mode of the optical disk recording and/or reproducing apparatus and compares the detection output signal transmitted from the monitoring detector 14 by way of the low-pass filter 16 with the reference signals $E_1$, $E_2$ and $E_3$ to transmit the comparison output signal to modulating means 19.

The modulating means 19 turns the comparison output signal produced at the comparator means 17 on and off with the recording data signal $E_D$, and is formed by a switching circuit which is turned on and off by the record data signals $E_D$ "1" and "0", respectively. The modulation output signal obtained at the modulation means 19 is transmitted to a summation circuit 20.

The summation circuit 20 is supplied with a bias current $i_{DC}$ from a bias circuit 21, and sums the bias current $i_{DC}$ with a modulation output signal obtained at the modulating means 19 to transmit the summation output signal to a driver circuit 22 for the semiconductor laser diode 13.

The bias circuit 21 sets the minimum value of the driving signal supplied by the driving circuit 22 to the semiconductor laser diode 13 so as to be equal to or less than the threshold current $I_{th}$ of the semiconductor laser diode 13. However, the bias current may be zero, as later described, and thus the bias circuit 21 may be dispensed with.

The operation of the laser diode driving apparatus of FIG. 3 according to the present invention will be explained with reference to the waveform diagram of FIG. 4.

Assuming that the recording and/or reproducing apparatus is at the recording mode, and the peak value of the optimum laser power is $P_0$, for example, the reference signal $E_1$ selected by the mode switch 18 during the recording mode is so set that the peak value of the recording current I(mA) is equal to $i_L$.

Thus the difference between the detection output signal of the reflected beam of the semiconductor laser diode 13 detected by the monitoring detector 14 and integrated by the low-pass filter 16 (the peak value) and the reference signal $E_1$ is set so as to be equal to the recording current $i_L$.

This recording current $i_L$ is turned on and off with the record data signal $E_D$ by the modulating means 19 and added to the bias current $I_{DC}$ at the summation circuit 20 to produce a driving signal $i_A$ which is transmitted by way of the driving circuit 22 to the semiconductor laser diode 13.

The record data signal $E_D$ is recorded as a record pattern in which the direction of magnetization on the recording surface of the optical disk 11 is changed with rising of the temperature of the recording surface to higher than the Curie temperature. This rise in temperature occurs when the laser power radiated during the recording mode reaches the peak in the course of changes of the laser power, as shown at $P_1$ in FIG. 4, of the light emission output of the semiconductor laser diode 13 driven by the driving circuit 22 with the driving signal $i_A$.

Figure 4:
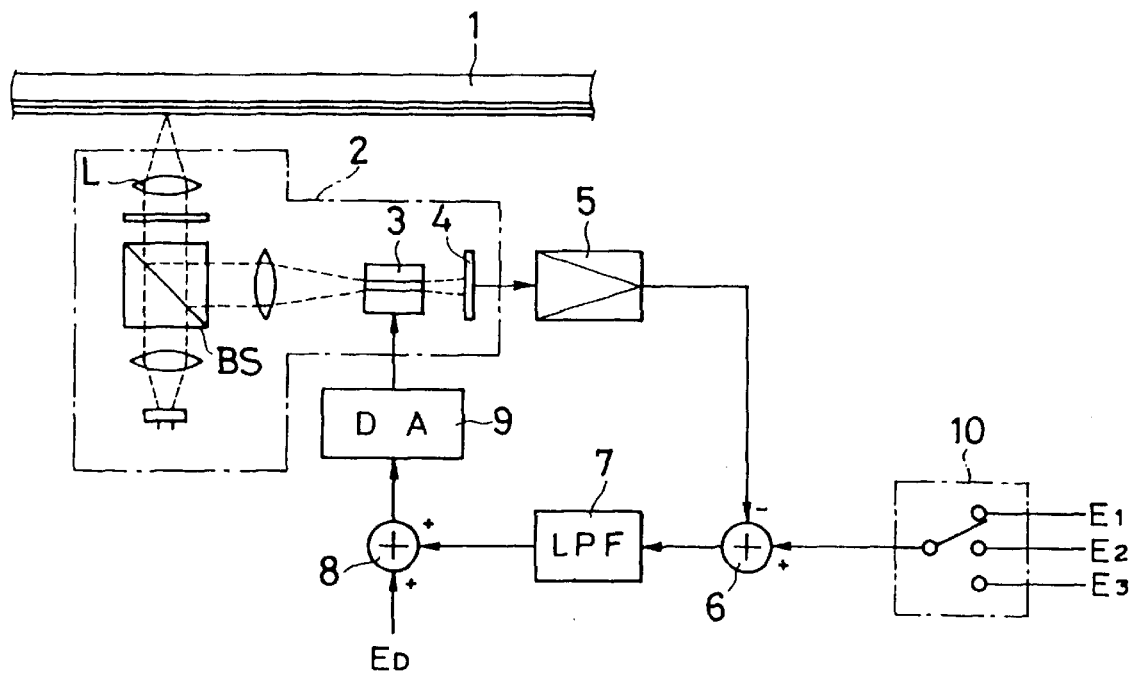
FIG. 4 is a waveform diagram for illustrating the operation of the laser diode driving apparatus.

In the operation of the above described APC circuit, when the light emission output characteristics of the semiconductor laser diode 13 are changed from the characteristic A to the characteristic B as shown in FIG. 4, as a result of replacement of the semiconductor laser diode 13 or temperature changes, for example, the detection output signal by the monitoring detector 14, taken out at the amplifier 15 and the low-pass filter 16, is decreased, so that the output signal of the comparator means 17 is increased.

The output signal of the comparator means 17 is turned on and off with the record data signal $E_D$ by modulating means 19, and added to the bias current current $I_{DC}$ at the summation circuit 20, with the resulting signal being supplied with the peak value of $i_{L1}$ to the driver circuit 22.

By loop control of the APC circuit, a drive signal $i_B$ is formed which has such a peak value $i_{L1}$ so that $P_1$, the laser power radiated during the recording mode of the semiconductor laser diode 13, will have an optimum peak value $P_0$.

Since the driving signal $i_B$ has its maximum amplitude value $I_{DP}$ controlled by the APC circuit, its minimum value is less than the threshold current $I_{th}$ of the semiconductor laser diode 13, with the laser power of the light emission output of the semiconductor laser diode 13 being on-off controlled sufficiently so that the recording pattern of a desired size and shape may be formed on the recording surface of the optical disk 11.

By providing modulating means 19 for modulating the current driving the semiconductor laser diode 13 in the APC circuit loop, as in the above embodiment, it becomes possible to cover fluctuations in light emission characteristics of the semiconductor laser diode 13 over a wide range, to relax the light emission characteristics of the semiconductor laser diode that may be employed as the semiconductor laser diode 13 as well as to widen the range of the working temperature to improve the durability of the semiconductor laser diode.

It is noted that, during the reproduction mode, the reference signal $E_2$ for the reproduction mode is selected by the mode switch 18, and the control by APC curcuit is performed so that the laser beam having a laser power low enough to permit data reading from the optical disk 11 is radiated from the semiconductor laser diode 13. During the erasure mode, the reference signal $E_3$ for the erasure mode is selected by the mode switch 18, and the control by APC curcuit is performed so that the laser beam having a laser power high enough to permit data erasure on the optical disk 11 is radiated from the semiconductor laser diode 13.

The above embodiment is concerned with driving the semiconductor laser diode 13 irradiating the laser beam on an overwrite optical disk 1 which is a magneto-optical disk having its recording surface formed of a photomagnetically recordable material. However, a write-once optical disk having its recording surface formed of an amorphous alloy material, such as $Sb_2Se_3$, $Bi_2Te_3$, that may be alloyed with rise in temperature, may be used as the optical disk 1. In this case, the erasure mode is not necessitated.

Figure 5:
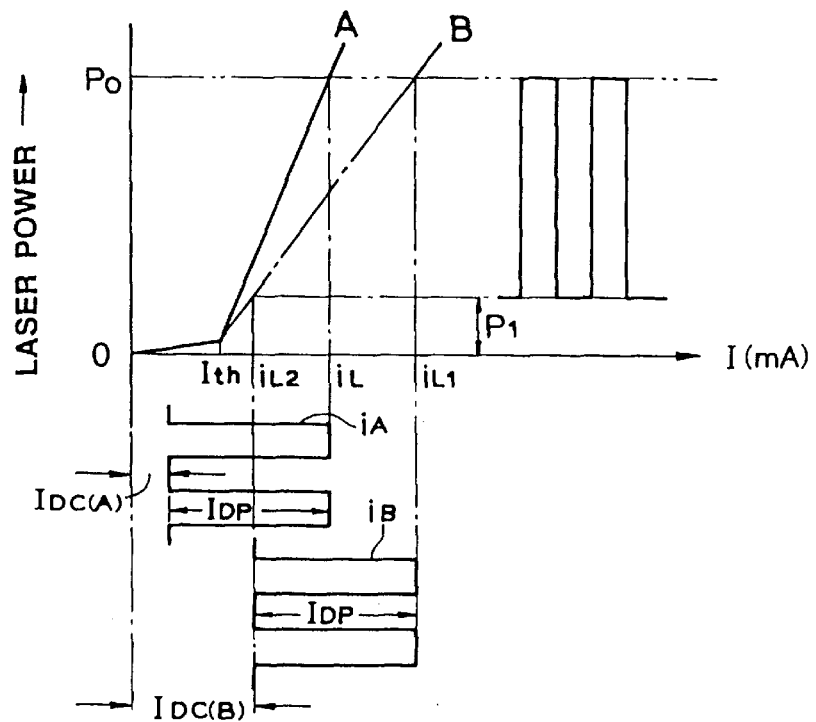
FIG. 5 is a circuit diagram showing a practical example of the laser diode driving apparatus according to the present invention.

FIG. 5 shows an example of the above described APC circuit, wherein $T_1$ denotes a terminal to which a laser power setting signal $E_{reff}$ is input, $T_2$ denotes an input terminal for a signal setting the bias current $I_{DC}$, 30 denotes a signal source outputting the record data signal $E_D$ or an erasure period signal and 40 denotes a modulator for the semiconductor laser diode 13.

This modulator 40 is comprised of a pair of transistors $Q_2$, $Q_3$ differentially connected to each other, and a transistor $Q_4$ having its collector connected to the emitters of the transistors $Q_2$, $Q_3$ and acting as a current source.

The transistors $Q_2$, $Q_3$ of the modulator 40 are supplied with complementary signals from the signal source 30 and thereby on-off controlled alternately. Even during the turn-off state of the transistor $Q_2$, the constant bias current $I_{DC}$ is supplied by way of transistor $Q_1$ to the semiconductor laser diode 13.

The output of the semiconductor device functioning as the monitoring detector 14 is amplified by an operational amplifier $A_2$ and supplied to a reverse phase input terminal of an operational amplifier $A_1$ functioning as comparator means.

The operational amplifier $A_1$ has its forward phase input terminal supplied with the laser power setting signal $E_{reff}$ from the terminal $T_1$, this signal $E_{reff}$ setting the light emission output power of the semiconductor laser diode 13. The operational amplifier $A_1$ functions as comparator means for effecting level comparison between-the laser power setting signal $E_{reff}$ and the detection output signal by the monitoring detector 14. The output of the comparator means formed by the operational amplifier $A_1$ controls the current flowing through the transistor $Q_4$ of the modulator 40, while controlling the maximum amplitude of the on/off current which is the driving signal for the semiconductor laser diode 13.

A feedback circuit formed by a parallel circuit of a resistor $R_1$ and a capacitor $C_1$ is annexed to the operational amplifier $A_1$, and functions to eliminate the high frequency signal or data signal component of the output signal.

It is noted that, when the modulator 40 has high through-rate switching characteristics, or when a semiconductor laser diode having an extremely low threshold current $I_{th}$ is used as the semiconductor laser diode 13, the circuit supplying the bias current $I_{DC}$ may be eliminated.

We claim:

1. A driving apparatus for driving a laser diode comprising a monitoring detector for detecting laser light outputted from the laser diode and providing a corresponding detector output, comparator means for comparing said detector output from the monitoring detector and a laser power setting signal and providing a compared output, modulating means for providing a modulation signal by selectively turning on and off said compared output of the comparator means in response to a recording signal, bias means for providing a constant bias current, summation means for summing said constant bias current with said modulation signal and providing a summation output signal, and driving means for driving said laser diode by said summation output signal.

2. The driving apparatus according to claim 1 wherein the constant bias current has a level that is not higher than a threshold current at or below which the laser diode has a light emitting output approximately equal to zero.

3. The driving apparatus according to claim 1 further comprising switching means for switching the laser power setting signal applied to said comparator means between a record mode level, an erasure mode level and a reproduction mode level.

* * * * *